(12) United States Patent
Ziegler et al.

(10) Patent No.: US 8,908,953 B2
(45) Date of Patent: Dec. 9, 2014

(54) IMAGING SYSTEM AND IMAGING METHOD FOR IMAGING A REGION OF INTEREST

(75) Inventors: Andy Ziegler, Wellington (NL); Michael Grass, Buchholz in der Nordheid (DE)

(73) Assignee: Koninklijke Philips N.V., Eindhoven (NL)

( * ) Notice: Subject to any disclaimer, the term of this patent is extended or adjusted under 35 U.S.C. 154(b) by 1398 days.

(21) Appl. No.: 12/663,851

(22) PCT Filed: Jun. 9, 2008

(86) PCT No.: PCT/IB2008/052256
§ 371 (c)(1),
(2), (4) Date: May 13, 2010

(87) PCT Pub. No.: WO2008/152562
PCT Pub. Date: Dec. 18, 2008

(65) Prior Publication Data
US 2010/0215242 A1 Aug. 26, 2010

(30) Foreign Application Priority Data
Jun. 11, 2007 (EP) ..................... 07109954

(51) Int. Cl.
*G06K 9/00* (2006.01)
*G06T 11/00* (2006.01)

(52) U.S. Cl.
CPC ......... *G06T 11/005* (2013.01); *G06T 2211/432* (2013.01)
USPC .......................................... 382/132; 382/128

(58) Field of Classification Search
CPC ................. G06T 2211/421; G06T 2211/424; G06T 2211/432; G06T 11/005; G06T 11/006; G06T 11/008

USPC .......... 382/100, 128–132, 103, 284; 128/920, 128/922; 703/2, 6, 11; 600/1, 45, 130, 159, 600/118, 139, 145, 173, 420, 424, 427, 434, 600/416, 415, 562, 587; 606/1, 45, 130, 606/159; 700/57, 245; 250/370.09; 378/98.8, 98.12, 98.1, 62, 19, 25, 21, 378/22, 98.7
See application file for complete search history.

(56) References Cited

U.S. PATENT DOCUMENTS 5,841,141 A * 11/1998 Gullberg et al. ......... 250/363.04
5,861,627 A * 1/1999 Basko et al. ............. 250/363.04
(Continued)

FOREIGN PATENT DOCUMENTS

WO 0062674 A1 10/2000
WO 2006082557 A2 8/2006
WO 2006129282 A2 12/2006

OTHER PUBLICATIONS

Koken, P., et al.; Aperture weighted cardiac reconstruction for cone-beam CT; 2006; Phys. Med. Biol.; 51:3433-3448.

(Continued)

*Primary Examiner* — Hadi Akhavannik
*Assistant Examiner* — Mehdi Rashidian

(57) ABSTRACT

The present invention relates to an imaging system for imaging a region of interest, wherein the imaging system comprises a projection data generation unit including a radiation source (2) and a detection unit (6) for acquiring projection data in different angular directions. The projection generation unit is adapted for acquiring projection data in an acquisition region on the detection unit. The imaging system further comprises a reconstruction unit (12) for reconstructing a first image of the region of interest from the acquired projection data and a forward projection unit (13) for forward projecting through the first image of the region of interest for calculating projection data corresponding to regions on the detection unit outside of the acquisition region. The reconstruction unit (12) is adapted for reconstructing a second image of the region of interest from the acquired projection data and from the calculated projection data.

19 Claims, 5 Drawing Sheets

(56) References Cited

U.S. PATENT DOCUMENTS

| | | | |
|---|---|---|---|
| 6,018,562 A * | 1/2000 | Willson | 378/9 |
| 6,343,110 B1 | 1/2002 | Li | |
| 6,385,278 B1 | 5/2002 | Hsieh | |
| 6,823,044 B2 * | 11/2004 | Rosner | 378/98.8 |
| 7,623,616 B2 * | 11/2009 | Ziegler et al. | 378/6 |
| 7,894,568 B2 * | 2/2011 | Ziegler | 378/5 |
| 2004/0034269 A1 * | 2/2004 | Ozaki | 600/1 |
| 2004/0066911 A1 | 4/2004 | Hsieh et al. | |
| 2009/0268862 A1 * | 10/2009 | Ziegler | 378/5 |
| 2010/0104161 A1 * | 4/2010 | Ziegler et al. | 382/131 |
| 2010/0246888 A1 * | 9/2010 | Bontus | 382/103 |
| 2011/0206259 A1 * | 8/2011 | Mistretta et al. | 382/131 |

OTHER PUBLICATIONS

Wiegert, J., et al.; Projection extension for region of interest imaging in Cone-Beam CT; 2005; Acad Radiol; 12:1010-1023.

* cited by examiner

IMAGING SYSTEM AND IMAGING METHOD FOR IMAGING A REGION OF INTEREST

FIELD OF THE INVENTION

The present invention relates to an imaging system, an imaging method and a computer program for imaging a region of interest.

BACKGROUND OF THE INVENTION

WO 2006/129282 A2 discloses a computed tomography system having an X-ray source and an X-ray detector array comprising a plurality of X-ray detector elements for detecting X-rays of the X-ray source. The detector array comprises a first centrally arranged region, in which the detector elements are located side by side, and two outer regions, in which some detector elements are missing. At the locations on the detector array, at which detector elements are missing, detection values cannot be acquired by the computed tomography system. In order to calculate detection values, which correspond to the locations on the detector array, at which detector elements are missing, acquired detection values from neighbored detector elements are used in an interpolation procedure. The computed tomography system reconstructs an image of an object located between the X-ray source and the X-ray detector array using the acquired detection values and the calculated detection values. Since the calculated detection values have been determined by interpolation, these detection values are subject to errors and cause artifacts in the reconstructed image, wherein the image quality is decreased.

SUMMARY OF THE INVENTION

It is an object of the present invention to provide an imaging system for imaging a region of interest, wherein the quality of a reconstructed image is improved, if calculated data are used for the reconstruction of the image. It is a further object of the present invention to provide a corresponding imaging method and a corresponding computer program.

In an aspect of the present invention an imaging system for imaging a region of interest is presented, wherein the imaging system comprises:
  a projection data generation unit comprising a radiation source and a detection unit for acquiring projection data in different angular directions, wherein the projection data generation unit is adapted for acquiring projection data in an acquisition region on the detection unit,
  a reconstruction unit for reconstructing a first image of the region of interest from the acquired projection data,
  a forward projection unit for forward projecting through the first image of the region of interest for calculating projection data corresponding to regions on the detection unit outside of the acquisition region,
wherein the reconstruction unit is adapted for reconstructing a second image of the region of interest from the acquired projection data and from the calculated projection data.

The invention is based on the idea that projection data, which have not been acquired, but which are calculated, are calculated by reconstructing a first image of the region of interest, being an intermediate image, from the acquired projection data and by forward projecting through this first image. Since the calculated projection data are calculated by using a reconstruction of the region of interest and by forward projecting through the corresponding reconstructed image, the calculated projection data are less prone to be subjected to errors in comparison to the state of the art, in which interpolations are used, and thus, the quality of the image, which is reconstructed by using theses calculated projection data values, is improved.

It is preferred that the projection data generation unit is adapted for acquiring projection data in an acquisition region being at least one first region and at least one second region on the detection unit, wherein the at least one first region has a larger extension in an extension direction than the at least one second region, and that the reconstruction unit is adapted for reconstructing a first image of the region of interest from the acquired projection data of the at least one first region.

Since the at least first region has a larger extension in an extension direction than the at least one second region, an object, which has to be reconstructed completely or partly, can more easily be arranged within the imaging system in the extension direction such that the projection data of the at least one first region are not truncated. Untruncated projection data can be used for reconstructing an image without truncation artifacts, because reconstruction steps like, for example, filtering steps, do not produce errors at the truncation edge. Therefore, the quality of the first image and, thus, of the calculated projection data and the final second image are further improved.

In a preferred embodiment, the radiation source and the region of interest move relative to each other around a rotational axis, wherein the extension direction is perpendicular to the rotational axis. Objects, like patients, which have to be imaged, are often longish, wherein the longitudinal axis is located parallel to the rotational axis. In a direction perpendicular to the rotational axis these objects comprise a shorter dimension. Therefore, in the direction perpendicular to the rotational axis the projection data of the first region having a larger extension in this perpendicular direction are more likely to be untruncated projections, which can be used for reconstructing a first image of the region of interest with improved quality.

It is preferred that the projection data generation unit is adapted for detecting untruncated projection data in the at least one first region on the detection unit. As already mentioned above, untruncated projection data in the at least one first region on the detection unit yield an improved quality of the first image.

In a further improved embodiment, the projection data generation unit is adapted for detecting truncated projection data in the at least one second region and the forward projection unit is adapted for forward projecting through the first image of the region of interest for calculating projection data corresponding to regions on the detection unit outside of the acquisition region such that calculated projection data together with truncated projection data in the at least one second region become untruncated projection data. Since the forward projection unit is adapted for calculating projection data such that these data together with truncated projection data of the at least one second region become untruncated projection data, these untruncated combined projection data can be used for reconstructing a second image of the region of interest having less artifacts and a further improved image quality, even if the projection data of the at least one second region are truncated projection data.

It is further preferred that the radiation source generates an illumination pattern for illuminating the detection unit only in the acquisition region. The radiation source comprises in particular a collimator which is adapted for generating an illumination pattern for illuminating the detection unit only in the acquisition region. This reduces the overall dose applied to the object which might be a patient.

It is further preferred that the detection unit comprises radiation-sensitive elements only in the acquisition region. Since the detection unit comprises preferentially radiation-sensitive elements only in the acquisition region, the overall costs of the detection unit is decreased.

The at least one first region and the at least one second region form preferentially a cross-like pattern on the detection unit. Furthermore, preferentially the at least one second region is centered with respect to the extension direction.

In a further aspect of the present invention an image generation device for generating an image of a region of interest from acquired projection data is presented, which have been acquired by a projection data generation unit comprising a radiation source and a detection unit for acquiring projection data in different angular directions, wherein the projection data generation unit is adapted for acquiring projection data in an acquisition region on the detection unit, wherein the image generation device comprises:

> a reconstruction unit for reconstructing a first image of the region of interest from the acquired projection data,
> a forward projection unit for forward projecting through the first image of the region of interest for calculating projection data corresponding to regions on the detection unit outside of the acquisition region, wherein the reconstruction unit is adapted for reconstructing a second image of the region of interest from the acquired projection data and from calculated projection data.

In a further aspect of the invention, an imaging method for imaging a region of interest is presented, wherein the imaging method comprises following steps:

> acquiring projection data in an acquisition region on a detection unit,
> reconstructing a first image of the region of interest from the acquired projection data,
> forward projecting through the first image of the region of interest for calculating projection data corresponding to regions on the detection unit outside of the acquisition region,
> reconstructing a second image of the region of interest from the acquired projection data and from the calculated projection data.

In a further aspect of the present invention, an image generation method for generating an image of a region of interest from acquired projection data is presented, which have been acquired by a projection data generation unit comprising a radiation source and a detection unit for acquiring projection data in different angular directions, wherein the projection data generation unit is adapted for acquiring projection data in an acquisition region on the detection unit, wherein the image generation method comprises following steps:

> reconstructing a first image of the region of interest from the acquired projection data,
> forward projecting through the first image of the region of interest for calculating projection data corresponding to regions on the detection unit outside of the acquisition region,
> reconstructing a second image of the region of interest from the acquired projection data and from calculated projection data.

In a further aspect of the present invention, a computer program for imaging a region of interest is presented, wherein the computer program comprises program code means for causing an imaging system as defined in claim 1 to carry out the steps of the method as claimed in claim 9, when the computer program is run on a computer controlling the imaging system.

In a further aspect of the present invention, a computer program for generating an image of a region of interest from acquired projection data is presented, wherein the computer program comprises program code means for causing an image generation device as defined in claim 8 to carry out the steps of the method as claimed in claim 10, when the computer program is run on a computer controlling the image generation device.

It shall be understood that the imaging system of claim 1, the image generation device of claim 8, the imaging method of claim 9, the image generation method of claim 10 and the computer programs of claims 11 and 12 have similar and/or identical preferred embodiments as defined in the dependent claims.

It shall be understood that preferred embodiments of the invention can also be any combination of the dependent claims with the respective independent claim.

BRIEF DESCRIPTION OF THE DRAWINGS

These and other aspects of the invention will be apparent from and elucidated with reference to the embodiments described hereinafter. In the following drawings

DETAILED DESCRIPTION OF EMBODIMENTS

Figure 1:
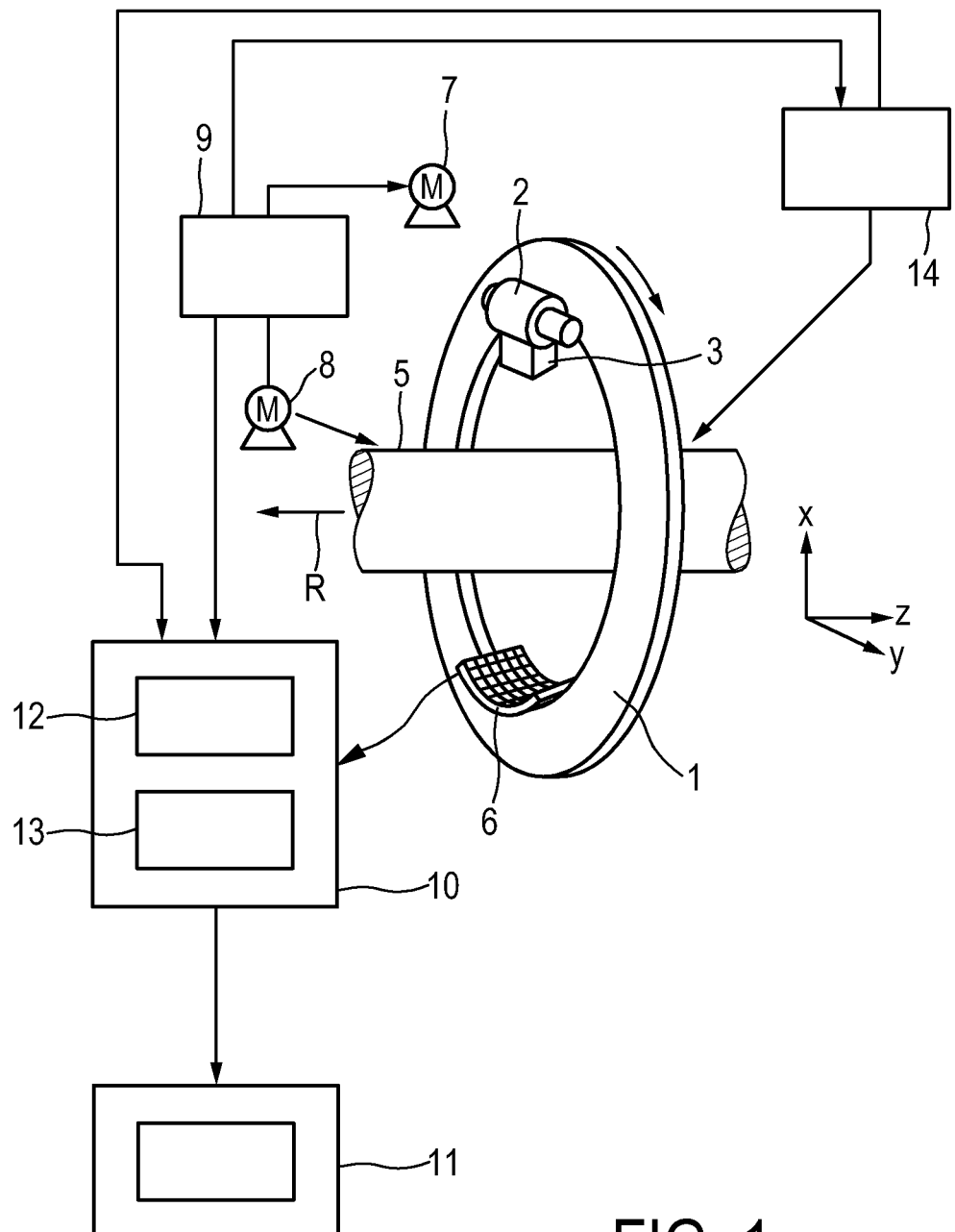
FIG. 1 shows schematically and exemplarily an representation of an imaging system for imaging a region of interest.

FIG. 1 shows schematically and exemplarily an imaging system for imaging a region of interest being, in this embodiment, a computed tomography system. The computed tomography system includes a gantry 1 which is capable of rotating around an rotational axis R, which extends parallel to the z direction. A radiation source 2, for example, an X-ray tube, is mounted on the gantry 1. The radiation source 2 is provided with a collimator device 3 which forms a radiation beam in a predetermined shape from the radiation emitted by the radiation source 2.

The radiation traverses an object (not shown in FIG. 1), such as a patient or a technical object, in a region of interest in a cylindrical examination zone 5. After having traversed the region of interest, the radiation beam is incident on a detection unit 6 having a two-dimensional detection surface 15. The detection unit 6 is mounted on the gantry 1.

Figure 2:
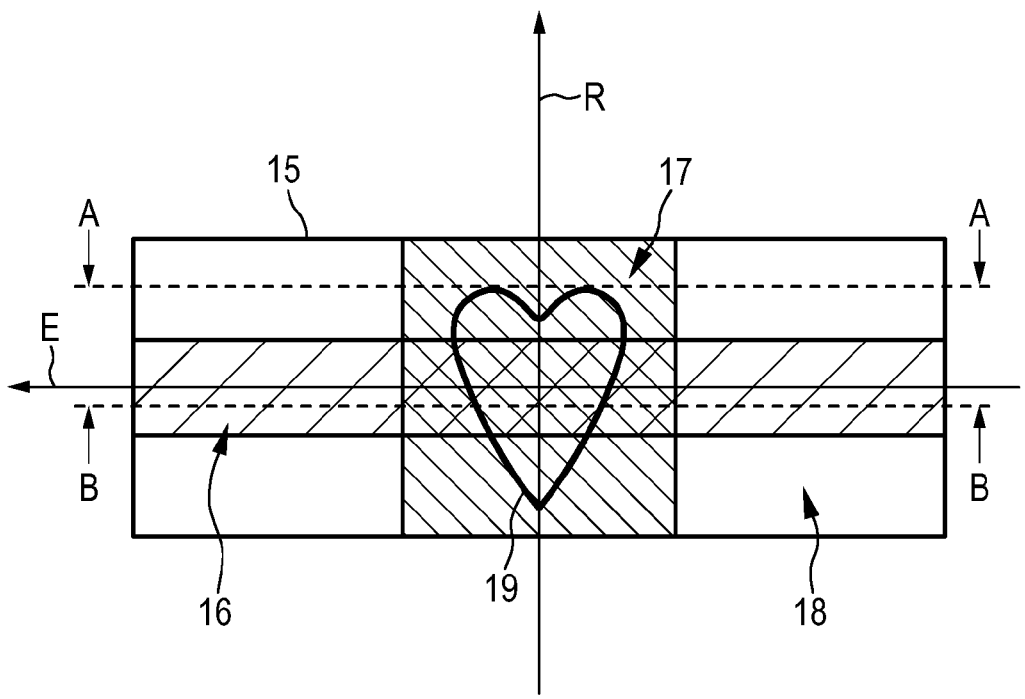
FIG. 2 shows schematically and exemplarily an acquisition region on a detection surface of a detection unit of an embodiment.

The two-dimensional detection surface 15 is schematically shown in FIG. 2.

In this embodiment, the object, which has to be imaged, is a heart within a patient. This means that the region of interest, which has to be imaged, contains the heart of the patient. A projection 19 of the heart is schematically shown in FIG. 2.

The collimation device 3 is adapted such that not the whole detection surface 15 is illuminated by the radiation, but only an acquisition region on the detection surface 15. In this embodiment, the acquisition region is a combination of a first region 16 and a second region 17. The first region 16 is a longish substantially rectangular region extending in an extension direction E perpendicular to the rotational axis R. The first region is located centrally on the detection surface 15 with respect to a direction parallel to the rotational axis R. Preferentially the first region 16 is in the extension direction E dimensioned such that for patients, which are located within the computed tomography system with their longitudinal axis parallel to the rotational axis R, acquired projection data of the first region 16 are untruncated.

The first region 16 overlaps with the second region 17, which extends over the whole detection surface 15 in a direction parallel to the rotational axis R and which has a shorter dimension in the extension direction E compared to the dimension in the same direction of the first region 16. The second region 17 is preferentially centered with respect to the extension direction E on the detection surface 15.

The first region 16 and the second region 17 are dimensioned such that projection data of these regions 16, 17 are sufficient for reconstructing an image of the heart considering a predetermined movement of the radiation source relative to the patient and a possible predetermined gating technique. Furthermore, the first region 16, in particular the width, i.e. the dimension of the first region 16 perpendicular to the extension direction E, is preferentially dimensioned such that, considering a predetermined movement of the radiation source relative to the patient, projection data are acquired in the first region 16 which are sufficient for reconstructing an image of the region of interest, wherein a possible predetermined gating technique is preferably not considered.

Figure 3:
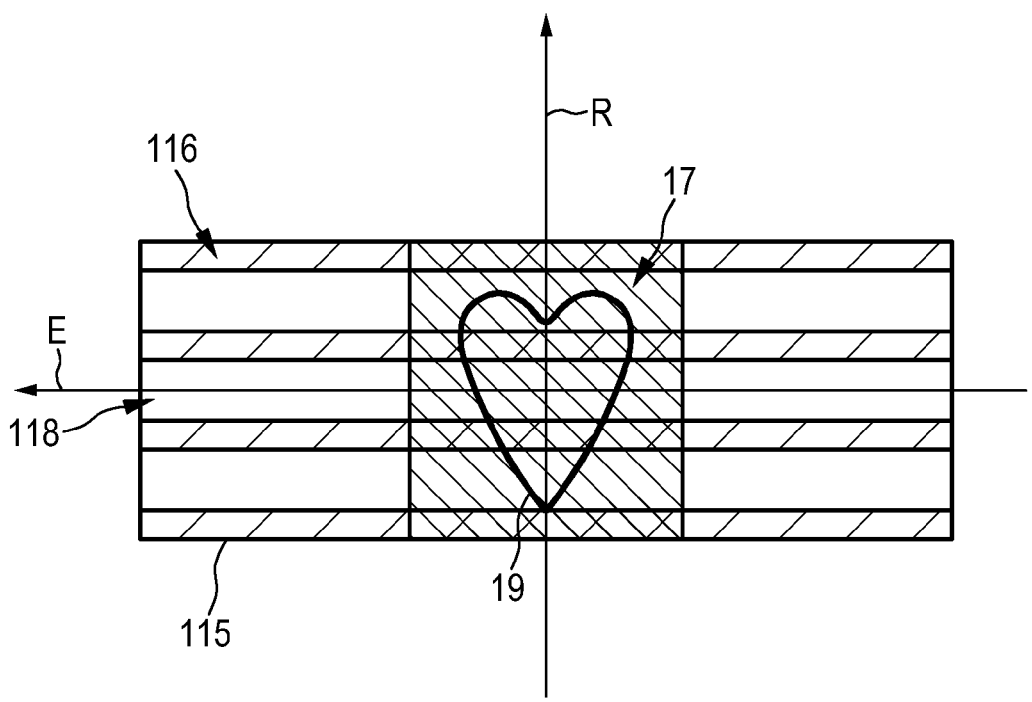
FIG. 3 shows schematically and exemplarily an acquisition region on a detection surface of a detection unit of another embodiment.

FIG. 3 shows schematically a detection surface 115 of another embodiment, wherein a second region 17 and several first regions 116 on the detection surface 115 are illuminated. The first regions 116 form together with the second region 17 a comb-like radiation pattern, whereas in FIG. 2 a cross-like radiation pattern is formed. The teeth of the comb-like radiation pattern extend parallel to the extension direction E over the whole detection surface 115. The width of the teeth, i.e. the dimension parallel to the rotational axis R, is dimensioned such that, considering the movement of the radiation source 2 with respect to the patient, projection data are acquired which are sufficient for reconstructing an image of the region of interest, i.e. in this embodiment of the heart.

Projection data are sufficient for reconstructing the region of interest, if from each voxel within the region of interest the radiation source 2 can be seen over an angular range of at least 180° during the acquisition of projection data.

The collimation device 3 is preferably adapted such that predetermined acquisition regions on the detection surface are generated, for example, the acquisition regions 16, 17; 116, 117 shown in FIGS. 2 and 3. Since not the whole detection surface 15; 115 is illuminated, the dose applied to the patient is reduced. Furthermore, preferably only the parts of the detection surface 15; 115, which are located in the acquisition regions 16, 17; 116, 117 comprise radiation-sensitive detector elements. Thus, not the whole detection surface 15; 115 comprises radiation-sensitive detector elements, which reduces the costs for a detection unit.

Referring again to FIG. 1, the gantry 1 is driven at a preferably constant but adjustable angular speed by a motor 7. A further motor 8 is provided for displacing the object, for example, a patient who is arranged on a patient table in the examination zone 5, parallel to the rotational axis or the z axis. These motors 7, 8 are controlled by a control unit 9, for instance, such that the radiation source 2 and the examination zone 5, in particular, the region of interest, move relative to each other along a helical trajectory.

During the movement of the radiation source 2 relative to the examination zone 5, the detection unit 6 generates projection data depending on the radiation incident on the detection surface of the detection unit. The projection data acquired by the detection unit 6 are provided to an image generation device 10 for generating an image of the region of interest from the acquired projection data. Also the image generation device 10 is preferentially controlled by the control unit 9. The imaging system further comprises, in this embodiment, a cardiac phase determination unit 14, which is, for example, an electrocardiograph, for generating cardiac phase data, in particular, an electrocardiogram, of the patient during the acquisition of projection data. The cardiac phase data generated by the cardiac phase determination unit 14, in particular, the electrocardiogram, are transmitted to the generation device 10. Preferentially, also the cardiac phase determination unit 14 is controlled by the control unit 9.

The image generation device 10 comprises a reconstruction unit 12 for reconstructing a first image of the region of interest from the acquired projection data, in particular, from the projection data of the first region, and a forward projection unit 13 for forward projecting through the first image of the region of interest for calculating projection data corresponding to regions 18; 118 on the detection surface 15; 115 outside the acquisition region 16, 17; 116, 117. In addition, the reconstruction unit 12 is adapted for reconstructing a second image being the final image of the region of interest from the acquired projection data and from the calculated projection data. The reconstruction unit 12 uses for the reconstruction of the second image the cardiac phase data received from the cardiac phase determination unit 14 using a gating technique, in order to reconstruct an image of the heart of a patient.

The reconstructed second image is provided to a display unit 11 for displaying the image.

Figure 4:
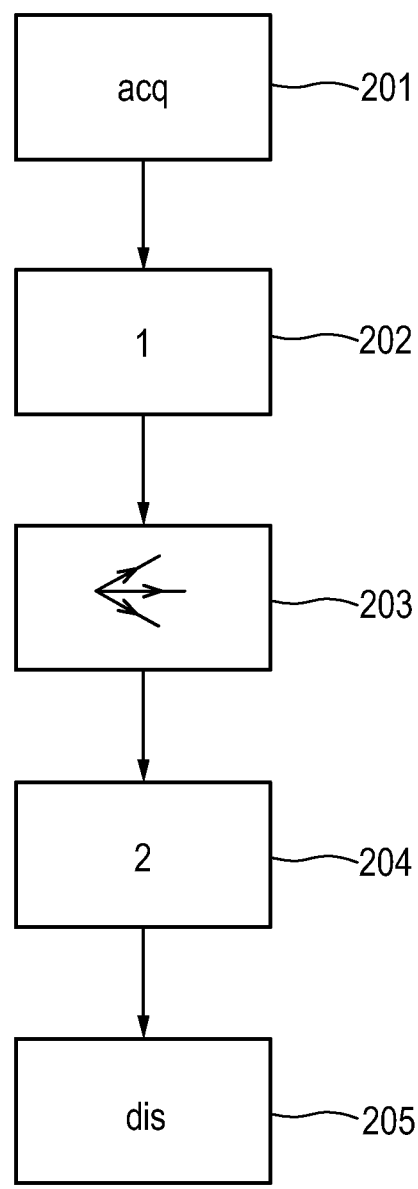
FIG. 4 shows a flowchart illustrating an embodiment of an imaging method for imaging a region of interest.

In the following an embodiment of an imaging method for imaging a region of interest in accordance with invention will be described in more detail with respect to a flowchart shown in FIG. 4.

In step 201, the radiation source 2 rotates around the rotational axis R or the z direction and the object is moved by, for example, moving a patient table parallel to the rotational axis R or the z direction, i.e. the radiation source 2 travels along a helical trajectory relative to the object. The radiation source 2 emits radiation, in this embodiment X-ray radiation, traversing the object, which is present in the examination zone 5. The radiation, which has traversed the object, is detected by the detection unit 6, which generates projection data. Thus, in step 201 projection data are acquired. Furthermore, during the acquisition of the projection data, the cardiac phase determination unit 14 generates cardiac phase data, for example, an electrocardiogram. The acquired projection data and the cardiac phase data are transmitted to the image generation device 10.

The second region 17 is dimensioned such that the region of interest, which includes the whole heart or a part of the heart, is completely within the cone defined by the second region 17 and the radiation source 2 during a predetermined time interval during the acquisition of the projection data, wherein the time interval is sufficient for reconstructing an image of the region of interest, even if gating techniques are used. Preferentially, the dimensions of the second region 17 are such that the above mentioned sufficiency condition is fulfilled. A larger second region 17 is not needed and would only increase the dose applied to the patient. Since the size of the second region 17 is limited as described above, the projection data in the second region 17 are generally truncated projections. In contrast, the first region 16 or the first regions 116 extend over the whole detection surface 15; 115 in the extension direction E perpendicular to the rotational axis R. Therefore, the projection data of the first region 16 or the first regions 116 are untruncated.

Figure 5:
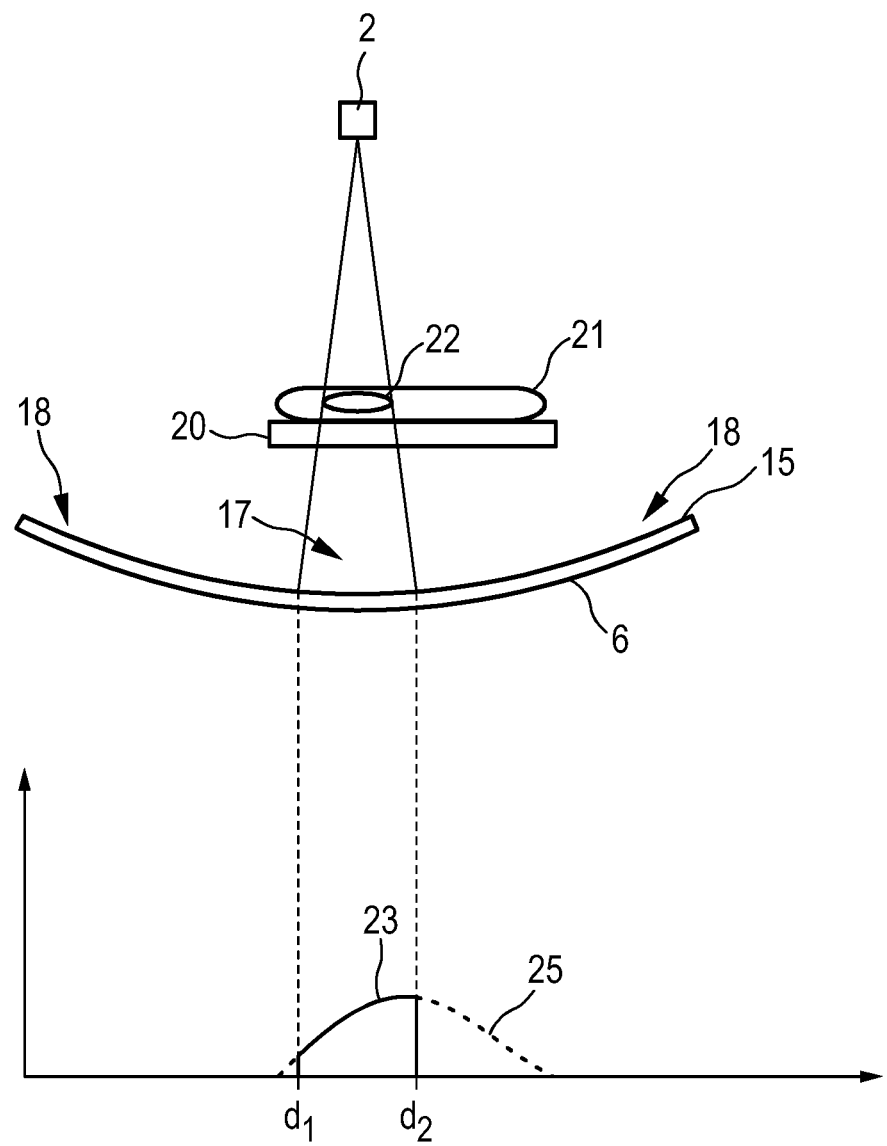
FIG. 5 shows in an upper part schematically and exemplarily an arrangement of a radiation source, a patient and a detection unit in a sectional view and in a lower part schematically and exemplarily a combination of truncated projection data and calculated projection data.

FIG. 5 shows in the upper part schematically a sectional view along the line A-A indicated in FIG. 2. This sectional view show a heart 22 of a patient 21, who is located on a patient table 20. Furthermore, this sectional view shows the radiation source 2 and the detection surface 15 of the detection unit 6. In this sectional view the radiation beam is collimated such that the heart 22 is within the radiation beam. The projection of the radiation beam on the detection surface 15 in this sectional view forms the second region 17. Outside of the second region 17 further regions 18 are located. In the lower part of FIG. 5 projection data 23 acquired in the second region 17 are shown, wherein on the horizontal axis the position on the detection surface 15 perpendicular to the rotational axis R and on the vertical axis the value of the respective projection data are illustrated. At the positions $d_1$, $d_2$ the projection data 23 comprise truncation edges, which would cause artifacts in a reconstructed image, if the projection data 23 with the truncation edges $d_1$, $d_2$ are used for reconstruction.

Figure 6:
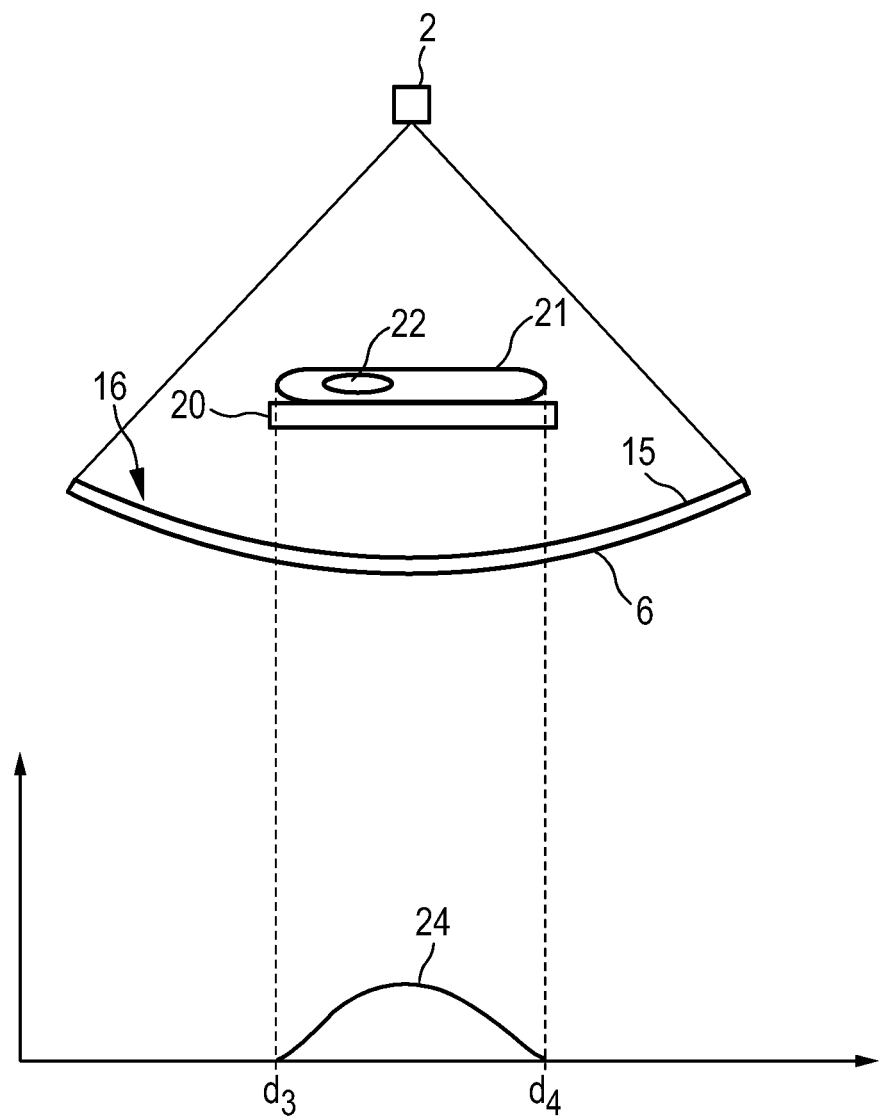
FIG. 6 shows in an upper part schematically and exemplarily the arrangement of the radiation source, the patient and the detection unit in another sectional view and in a lower part schematically and exemplarily untruncated projection data.

FIG. 6 schematically shows in the upper part a sectional view along a line B-B indicated in FIG. 2. Also this sectional view shows a heart 22 of a patient 21 located on a patient table 20. In this sectional view the patient 21 is completely within the radiation beam emitted from the radiation source 2 and incident on the first region 16 on the detection surface 15 of the detection unit 6. In the lower part of FIG. 6 projection data 24 acquired in the first region 16 are schematically shown. These projection data 24 do not comprise truncation edges, in particular, transmissions at the positions $d_3$, $d_4$ are smooth. A reconstruction of an image using these untruncated projection data 24 will not cause truncation artifacts in a reconstructed image.

In step 202, the reconstruction unit 12 reconstructs a first image of the region of interest from the acquired projection data of the first region 16 or the first regions 116. Since these projection data are untruncated, a first image can be reconstructed, which does not comprise artifacts caused by truncation. The first image is preferentially reconstructed by a filtered backprojection.

In step 203, the forward projection unit 13 forward projects through the first image for calculating projection data corresponding to regions 18; 118 on the detection surface 15; 115 outside of the acquisition region 16, 17; 116, 117. Thus, the gaps 18; 118 in FIGS. 2, 3 are filled with calculated projection data which are determined by forwards projection.

Since the gaps 18; 118 on the detection surface 15; 115 have been filled by calculated projection data 25, the acquired projection data 23 of the second region 17 have now become, in combination with the calculated projection data 25, untruncated projection data. This is schematically shown in the lower part of FIG. 6.

In step 204, the reconstruction unit 12 reconstructs a second image of the region of interest using the acquired projection data of the first region 16 or the first regions 116 and of the second region 17 and the calculated projection data. Furthermore, in this embodiment, the reconstruction unit 12 uses the cardiac phase data received from the cardiac phase determination unit 14 for performing a known cardiac gating technique for reconstructing the second image of the region of interest.

Cardiac gating techniques, which can be used for reconstructing the second image of the region of interest, use generally projection data corresponding to cardiac phases, in which the heart moves less than in other cardiac phases. A cardiac gating technique which can be used for reconstructing the second image of the region of interest, is, for example, disclosed in "Aperture weighted cardiac reconstruction for cone-beam CT", P. Koken and M. Grass, Phys. Med. Biol. 51 (2006) 3433-3448, which is herewith incorporated by reference.

In step 205, the second image is provided to the display unit 11 for displaying the second image.

If, in another embodiment, the projection data and the cardiac phase data have already been acquired, these data can be provided to the image generation device 10, which performs an image generation method for generating an image of a region of interest by performing the steps 202 to 205. In this case, the acquisition of projection data and of the cardiac phase data is not needed.

Although in the above described embodiment schematically shown in FIG. 2 the first region 16 is located centrally with respect to a direction parallel to the rotational axis R, the invention is not limited to this central position of the first region. The first region could also be located offset from the center with respect to a direction parallel to the rotational axis R, i.e., in the orientation shown in FIG. 2, the first region can be located in an upper or lower part of the detection surface 15.

Although in the above described embodiment the object, which has to be reconstructed, is mainly a heart of a patient, the invention is not limited to an application of a heart of a patient. Also other parts of a patient, for example, other organs, can be imaged by the imaging system. Furthermore, also technical objects can be imaged by the imaging system.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit may fulfill the functions of several items recited in the claims. The mere fact that certain measures are recited in mutually different dependent claims does not indicate that a combination of these measures cannot be used to advantage.

Calculations, determinations and/or reconstructions performed by one or several units or devices can be performed by any other number of units or devices. For example, the reconstruction of the first image, the forward projection through the first image and the reconstruction of the second image can be performed by a single unit or, for example, by three different units. The calculations, determinations and/or reconstructions can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. An imaging system for imaging a region of interest, the imaging system comprising:

a projection data generation hardware unit comprising a radiation source and a detection unit that acquires projection data in different angular directions, wherein the projection data generation unit acquires projection data in an acquisition region on the detection unit, a reconstruction hardware unit that reconstructs a first image of the region of interest from the acquired projection data, a forward projection hardware unit that forward projects through the first image of the region of interest to calculate projection data corresponding to regions on the detection unit outside of the acquisition region, wherein the reconstruction unit reconstructs a second image of the region of interest from the acquired projection data and from the calculated projection data.

2. The imaging system of claim 1, wherein the projection data generation hardware unit acquires projection data in an acquisition region being at least one first region and at least one second region on the detection unit, wherein the at least one first region has a larger extension in an extension direction than the at least one second region, and the reconstruction hardware unit reconstructs a first image of the region of interest from the acquired projection data of the at least one first region.

3. The imaging system of claim 2, wherein the radiation source and the region of interest move relative to each other around a rotational axis and wherein the extension direction is perpendicular to the rotational axis.

4. The imaging system of claim 2, wherein the projection data generation hardware unit detects untruncated projection data in the at least one first region on the detection unit.

5. The imaging system of claim 4, wherein the projection data generation hardware unit detects truncated projection data in the at least one second region, and the forward projection hardware unit forward projects through the first image of the region of interest for calculating projection data corresponding to regions, on the detection unit outside of the acquisition region such that calculated projection data together with truncated projection data in the at least one second region become untruncated projection data.

6. The imaging system of claim 1, wherein the radiation source generates an illumination pattern for illuminating the detection unit only in the acquisition region.

7. The imaging system of claim 1, wherein the detection unit comprises radiation-sensitive elements only in the acquisition region.

8. An image generation device that generates an image of a region of interest from acquired projection data, which have been acquired by a projection data generation unit comprising a radiation source and a detection unit that acquires projection data in different angular directions, wherein the projection data generation unit acquires projection data in an acquisition region on the detection unit, wherein the image generation device comprises:

a reconstruction hardware unit that reconstructs a first image of the region of interest from the acquired projection data, a forward projection hardware unit that forward projects through the first image of the region of interest to calculate projection data corresponding to regions on the detection unit outside of the acquisition region, wherein the reconstruction hardware unit reconstructs a second image of the region of interest from the acquired projection data and from calculated projection data.

9. An imaging method for imaging a region of interest comprising following steps: acquiring projection data in an acquisition region on a detection hardware unit, reconstructing a first image of the region of interest from the acquired projection data, forward projecting through the first image of the region of interest to calculate projection data corresponding to regions on the detection unit outside of the acquisition region, reconstructing a second image of the region of interest from the acquired projection data and from the calculated projection data.

10. An image generation method for generating an image of a region of interest from acquired projection data, which have been acquired by a projection data generation hardware unit comprising a radiation source and a detection unit for acquiring projection data in different angular direction, wherein the projection data generation hardware unit acquires projection data in an acquisition region on the detection unit, wherein the image generation method comprises:

reconstructing a first image of the region of interest from the acquired projection data, forward projecting through the first image of the region of interest to calculate projection data corresponding to regions on the detection unit outside of the acquisition region, reconstructing a second image of the region of interest from the acquired projection data and from calculated projection data.

11. A non-transitory computer readable medium having stored thereon a computer program for imaging a region of interest, the computer program comprising program code means for causing an imaging system to carry out the steps of the method as claimed in claim 9, when the computer program is run on a computer controlling the imaging system.

12. A non-transitory computer readable medium having stored thereon a computer program for generating an image of a region of interest from acquired projection data, the computer program comprising program code means for causing an image generation device to carry out the steps of the method as claimed in claim 10, when the computer program is run on a computer controlling the image generation device.

13. The imaging generation device of claim 8, wherein the projection data generation hardware unit acquires projection data in an acquisition region being at least one first region and at least one second region on the detection unit, wherein the at least one first region has a larger extension in an extension direction than the at least one second region, and the reconstruction unit reconstructs a first image of the region of interest from the acquired projection data of the at least one first region.

14. The imaging generation device of claim 13, wherein the radiation source and the region of interest move relative to each other around a rotational axis and wherein the extension direction is perpendicular to the rotational axis.

15. The imaging system as defined in claim 13, wherein the projection data generation hardware unit detects untruncated projection data in the at least one first region on the detection unit.

16. The image generation method of claim 9, further comprising:

acquiring projection data in an acquisition region being at least one first region and at least one second region, wherein the at least one first region has a larger extension in an extension direction than the at least one second region, and reconstructing a first image of the region of interest from the acquired projection data of the at least one first region.

17. The image generation method of claim 16, further comprising detecting untruncated projection data in the at least one first region.

18. The image generation method of claim 17, further comprising:
   detecting truncated projection data in the at least one second region, and
   forward projecting through the first image of the region of interest to calculate projection data corresponding to regions outside of the acquisition region such that calculated projection data with truncated projection data in the at least one second region become untruncated projection data.

19. The image generation method of claim 9, further comprising generating an illumination pattern for illuminating only in the acquisition region.

* * * * *